US006915213B2

(12) United States Patent
Inoue

(10) Patent No.: US 6,915,213 B2
(45) Date of Patent: Jul. 5, 2005

(54) AIR-FUEL RATIO COMPUTING APPARATUS

(75) Inventor: Junichi Inoue, Tokyo (JP)

(73) Assignee: Mitsubishi Denki Kabushiki Kaisha, Tokyo (JP)

(*) Notice: Subject to any disclaimer, the term of this patent is extended or adjusted under 35 U.S.C. 154(b) by 0 days.

(21) Appl. No.: 10/773,432

(22) Filed: Feb. 9, 2004

(65) Prior Publication Data

US 2005/0049798 A1 Mar. 3, 2005

(30) Foreign Application Priority Data

Aug. 27, 2003 (JP) ....................................... 2003-303355

(51) Int. Cl.[7] ................................................ G01N 19/00
(52) U.S. Cl. .......................................... 702/24; 123/688
(58) Field of Search ............................ 702/24; 123/439, 123/306, 430, 688, 698; 431/10; 432/13; 60/274, 277; 701/114; 338/34; 422/94

(56) References Cited

U.S. PATENT DOCUMENTS 4,951,632 A * 8/1990 Yakuwa et al. ............. 123/688
5,392,598 A * 2/1995 White et al. .................. 60/274
6,089,016 A * 7/2000 Takaku ........................ 60/277
6,210,641 B1 * 4/2001 Yamada et al. ............... 422/94
6,830,043 B2 * 12/2004 Morinaga et al. ........... 123/698
2001/0000956 A1 * 5/2001 Honda et al. ................. 338/34
2004/0025856 A1 * 2/2004 Iida et al. .................... 123/688
2004/0249556 A1 * 12/2004 Makki et al. ............... 701/114

FOREIGN PATENT DOCUMENTS

JP 2001-221095 A 8/2001

* cited by examiner

*Primary Examiner*—Bryan Bui
*Assistant Examiner*—Xiuqin Sun
(74) *Attorney, Agent, or Firm*—Sughrue Mion, PLLC

(57) ABSTRACT

The air-fuel ratio computing apparatus includes a linear air-fuel ratio sensor for measuring an air-fuel ratio of exhaust gas and an electronic control unit for repeatedly performing filter processing on the air-fuel ratio, using a formula $$Vf(n)=(1-G)\times Vf(n-1)+G\times V(n).$$

In a case where a temperature of the sensor is low, the unit cuts off a pump current to the sensor, performs the filter processing with the filter gain G set to a large value, and transforms a computed value from the filter processing into a theoretical air-fuel ratio voltage and in a case where the temperature of the sensor rises to or above a predetermined temperature, the unit performs the filter processing with a filter gain G set to a small value, and computes an air-fuel ratio from the difference between a computed value from the filter processing and the theoretical air-fuel ratio voltage.

3 Claims, 4 Drawing Sheets

AIR-FUEL RATIO COMPUTING APPARATUS

BACKGROUND OF THE INVENTION

1. Field of the Invention

The present invention relates to an air-fuel ratio computing apparatus for measuring and computing an air-fuel ratio of an internal combustion engine, and more particularly to an air-fuel ratio computing apparatus for suppressing deterioration of exhaust gas due to deviation of a calibration value for calibrating a theoretical air-fuel ratio voltage.

2. Description of the Related Art

In a correction device for a conventional air-fuel ratio detection apparatus, when a condition for stopping air-fuel ratio feedback control is determined based on various signals, a pump current flowing to a wide area type air-fuel ratio sensor is cut, output values of a circuit for transforming the pump current into voltage signals are measured more than once and averaged, a correction value is calculated by subtracting the average value of the output values from a standard voltage equivalent to the theoretical air-fuel ratio, and the newest computed value is stored (backed up) immediately before stopping engine operations. Then, when performing air-fuel ratio feedback control, at a time when the above-mentioned correction computation is not being performed, an air-fuel ratio detection value (digital value) is obtained from a conversion table, based on a corrected value produced by adding the above-mentioned correction value to the output value of the circuit for transforming the pump currents into the voltage signals (e.g., see JP 2001-221095 A (p. 1, FIG. 3)).

In the conventional apparatus as described above, when a voltage outputted from the air-fuel ratio detection apparatus passes through a 10-bit A/D converter, an A/D converted value always oscillates at an amplitude of several LSBs (meaning 2–3 bits at the smallest digit). Since the theoretical air-fuel ratio voltage is calibrated based on the A/D value, the calibrated theoretical air-fuel ratio voltage also has a width of several LSBs. This deviation of several LSBs in the theoretical air-fuel ratio voltage does not affect exhaust gas when running for a short time. However, when running for a long time, this small error accumulates, creating a problem of lowering a cleansing rate of a three-way catalyst.

Further, as a characteristic of a linear air-fuel ratio sensor, the amount of change in the air-fuel ratio per unit voltage is greater on a richer side of the theoretical air-fuel ratio than on a leaner side thereof. In other words, even if the voltage deviation from the theoretical air-fuel ratio is the same, the air-fuel ratio error will be greater when performing calibration toward the lean side, which causes a problem in that this has a great effect on the exhaust gas.

SUMMARY OF THE INVENTION

The present invention has been made to solve the above-mentioned problems, and therefore has an object to obtain an air-fuel ratio computing apparatus which suppresses a deviation of a theoretical air-fuel ratio to thereby suppress influence on the exhaust gas, and reduces the calibration toward the lean side where the exhaust gas is easily affected.

According to the present invention, there is provided an air-fuel ratio computing apparatus including a linear air-fuel ratio sensor provided to an exhaust pipe of an engine, for measuring an air-fuel ratio of exhaust gas emitted from the engine and an electronic control unit for repeatedly performing filter processing on the air-fuel ratio measured by the linear air-fuel ratio sensor, using a formula $Vf(n)=(1-G)\times Vf(n-1)+G\times V(n)$, where $V(n)$ represents a voltage value corresponding to the air-fuel ratio measured by the linear air-fuel ratio sensor, $Vf(n-1)$ represents a previous computed value from the filter processing, $G(0\leqq G\leqq 1)$ represents a filter gain expressing a computational ratio of $V(n)$ and $Vf(n-1)$, and $Vf(n)$ represents a current computed value of the filter processing.

In a case where a temperature of the linear air-fuel ratio sensor is below a predetermined temperature, the electronic control unit cuts off a pump current to the linear air-fuel ratio sensor, performs the filter processing with the filter gain G set to a first predetermined value, and transforms a computed value from the filter processing into a theoretical air-fuel ratio voltage; and in a case where the temperature of the linear air-fuel ratio sensor rises to or above the predetermined temperature, the electronic control unit performs the filter processing with the filter gain G set to a second predetermined value that is smaller than the first predetermined value, and computes an air-fuel ratio from the difference between a computed value from the filter processing and the theoretical air-fuel ratio voltage.

The air-fuel ratio computing apparatus according to the present invention filters the voltage value transformed from the voltage outputted from the air-fuel ratio detection circuit by means of the A/D converter, and the filter gain used in the filter processing is set independently by cutting off/connecting the pump current. This guarantees the responsiveness of the air-fuel ratio computations when the pump current is cut off, and also suppresses the oscillations of the A/D voltage value when the pump current is cut off, thereby suppressing the influence on the exhaust gas caused by the deviation in the theoretical air-fuel ratio voltage. Moreover, when the voltage values from the filter processing are transformed into the theoretical air-fuel ratio voltages, values which are below the resolution of the theoretical air-fuel ratio voltage are calibrated toward a side with smaller error, so that the influence on the exhaust gas can be suppressed.

DETAILED DESCRIPTION OF THE PREFERRED EMBODIMENTS

Embodiment 1

Figure 1:
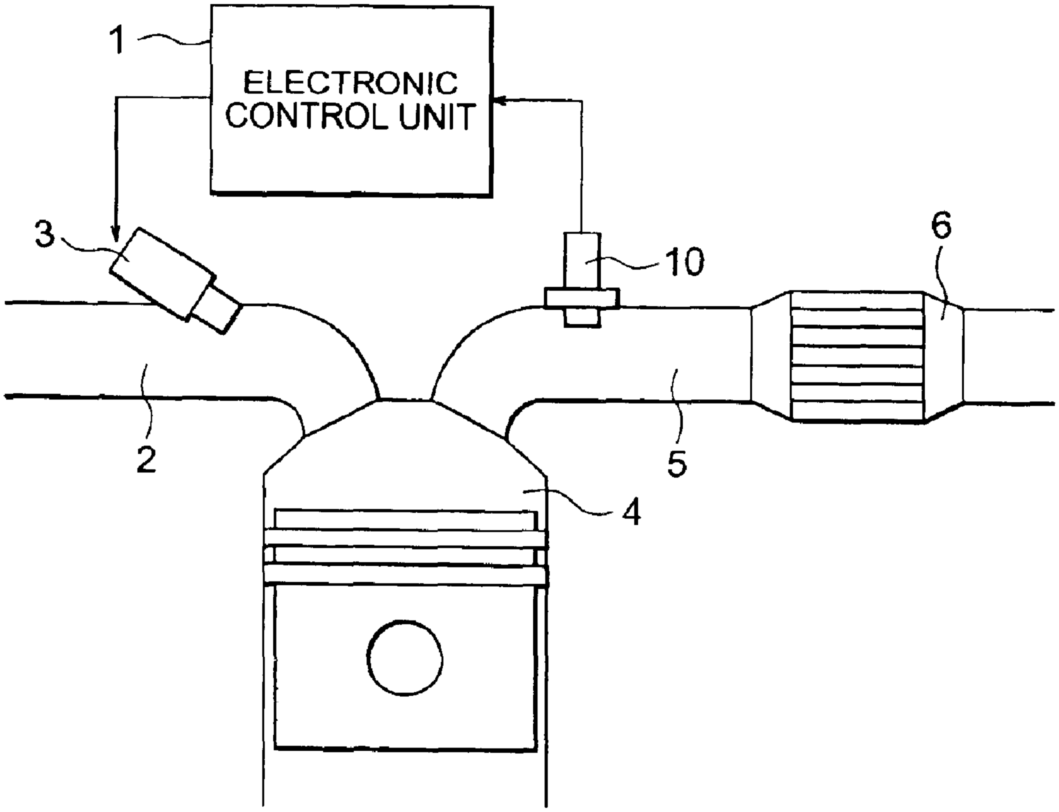
FIG. 1 is a diagram showing a construction of an internal combustion engine serving as an air-fuel ratio computing apparatus according to Embodiment 1 of the present invention.

An air-fuel ratio computing apparatus according to Embodiment 1 of the present invention is explained below, with reference to the drawings. FIG. 1 is a diagram showing a construction of an internal combustion engine as an air-fuel ratio computing apparatus according to Embodiment 1 of the present invention. Note that in each of the diagrams, the same reference numerals denote the same or corresponding parts and components.

In FIG. 1, an electronic control unit 1 is electrically connected to a fuel injection unit 3 provided to an air intake pipe 2, and a fuel injection amount can be adjusted by means of drive signals to the fuel injection unit 3. The fuel injected into the air intake pipe 2 is combusted by an engine 4 and made to flow as exhaust gas to an exhaust pipe 5. Further, the electronic control unit 1 is also connected electrically to a linear air-fuel ratio sensor 10 provided to the exhaust pipe 5, and the air-fuel ratio of the exhaust gas emitted from the engine 4 can be measured by the linear air-fuel ratio sensor 10. Further, the exhaust pipe 5 is provided with a three-way catalyst 6, and is capable of cleansing harmful elements such as HC, CO, $NO_x$, and the like which are included in the exhaust gas. However, in order to effectively cleanse all three harmful elements, it is necessary to control the fuel injection amount to, for example, a theoretical air-fuel ratio. The electronic control unit 1 adjusts the fuel injection amount of the fuel injection unit 3 based on the air-fuel ratio measured by the linear air-fuel ratio sensor 10 and computed, so that the three-way catalyst can be used effectively to cleanse the exhaust gas.

Figure 2:
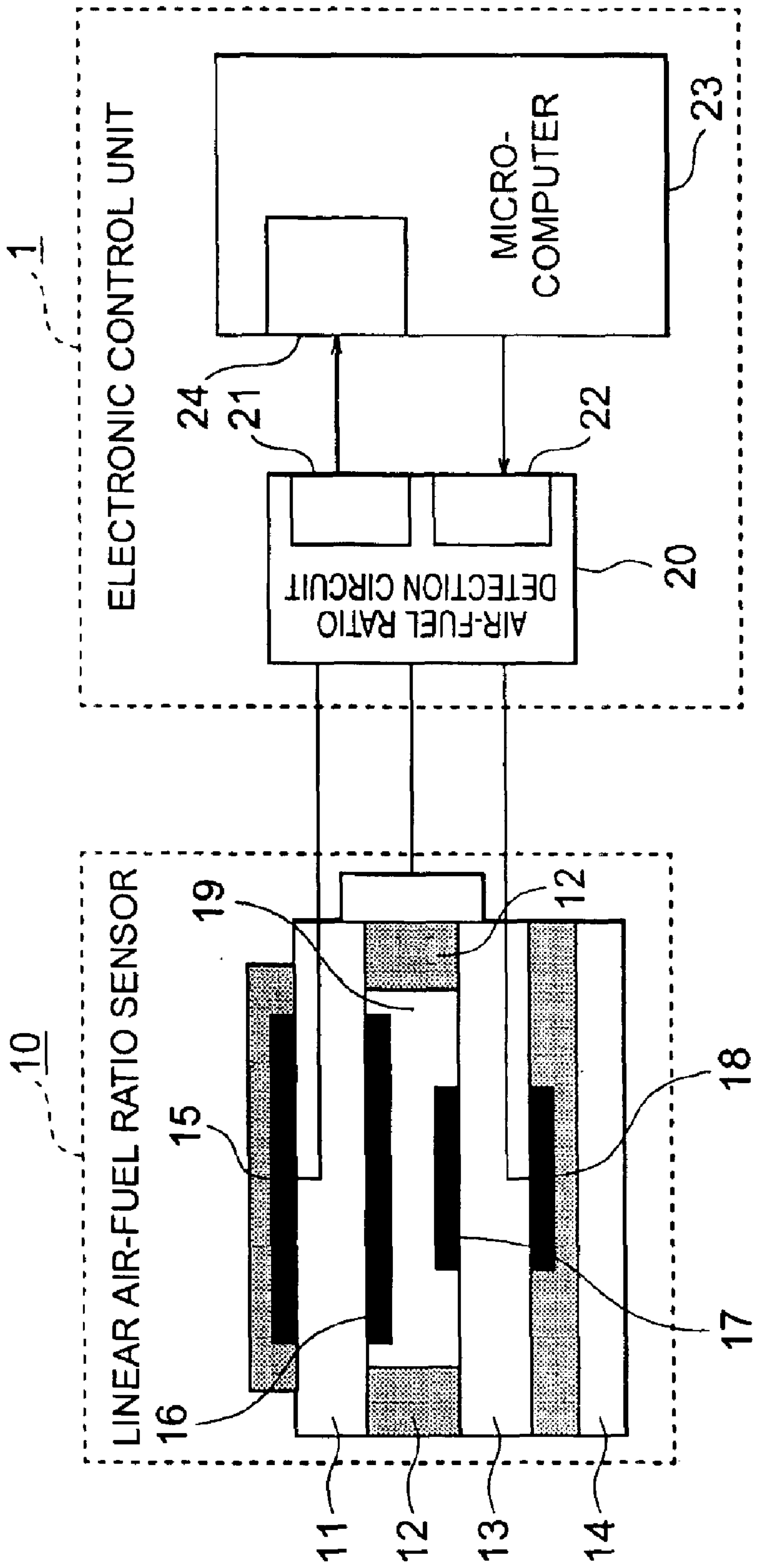
FIG. 2 is a diagram showing constructions of a linear air-fuel ratio sensor and an electronic control unit of the air-fuel ratio computing apparatus according to Embodiment 1 of the present invention.
Figure 3:
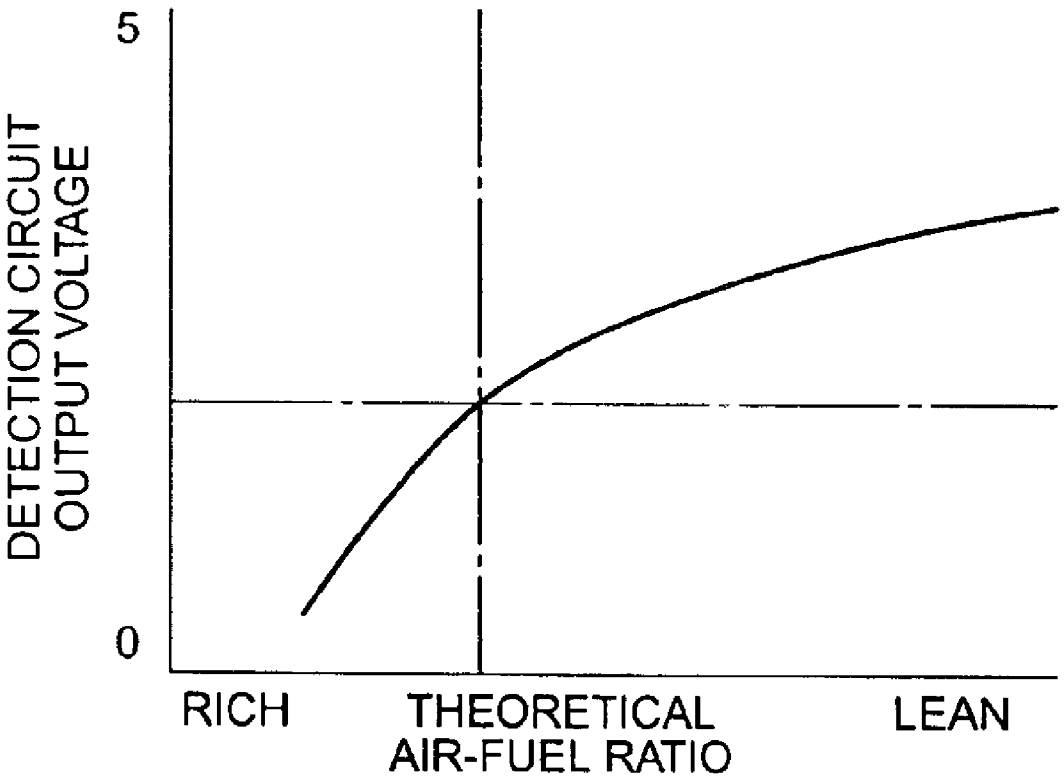
FIG. 3 is a diagram showing characteristics of the linear air-fuel ratio sensor of the air-fuel ratio computing apparatus according to Embodiment 1 of the present invention.

FIG. 2 is a diagram showing constructions of the linear air-fuel ratio sensor and the electronic control unit of the air-fuel ratio computing apparatus according to Embodiment 1 of the present invention. Further, FIG. 3 is a diagram showing characteristics of the linear air-fuel ratio sensor of the air-fuel ratio computing apparatus according to Embodiment 1 of the present invention. In FIG. 3, the horizontal axis represents the air-fuel ratio, and the vertical axis represents an output voltage of an air-fuel ratio detection circuit.

In FIG. 2, the linear air-fuel ratio sensor 10 is constituted by an aggregate body including a pump cell 11, a porous diffusion layer 12, an electromotive cell 13, and a reinforcing plate 14. The pump cell 11 is formed by stable zirconia elements (which are oxygen ion conductive solid electrolyte materials), and has porous electrodes 15 and 16 formed mainly of platinum on its front surface and back surface, respectively. Further, the electromotive cell 13 is also formed with stable zirconia elements, and has porous electrodes 17 and 18 formed mainly of platinum on its front surface and back surface, respectively. The electromotive cell 13 produces an electromotive force when there is a difference in oxygen concentration between the electrodes on the same principle as the conventional oxygen sensor. The pump cell 11 adds/removes oxygen to/from a measuring chamber 19 where the pump current flows.

The electronic control unit 1 is constituted by an air-fuel ratio detection circuit 20 and a microcomputer 23. Further, the air-fuel ratio detection circuit 20 has a current/voltage conversion circuit 12 (which controls the pump current, converts the pump current into the voltage signals as shown in FIG. 3, and outputs to the microcomputer 23), and a pump current cut-off circuit 22 for cutting off the pump current. The air-fuel ratio detection circuit 20 detects the temperature of the linear air-fuel ratio sensor 10, based on the electric current value flowing in a resistance (which has a resistance value changing with the temperature, and is not shown in the diagram) inside the linear air-fuel ratio sensor 10.

Further, the air-fuel ratio detection circuit 20 performs feedback control on the pump current flowing to the pump cell 11, so as to maintain a steady electromotive force from the electromotive cell 13 of the linear air-fuel ratio sensor 10, i.e., so as to maintain the electromagnetic cell 13 at a steady oxygen concentration with respect to the theoretical air-fuel ratio. At this time, the pump current changes continuously with respect to the air-fuel ratio; therefore, the air-fuel ratio can be obtained by measuring the pump current.

As described above, the linear air-fuel ratio sensor 10 includes: the electromotive sensor 13 which is constituted of the oxygen ion conductive solid state electrolyte material and outputs the electric signals based on the oxygen concentration in the exhaust gas; and the pump cell 11 which makes oxygen ions transfer in accordance with a provided pump current. The air-fuel ratio detection circuit 20 outputs the pump current to the pump cell 11 such that the output from the electromotive cell 13 becomes a set value, and outputs an air-fuel ratio signal by means of a voltage according to the pump current. Further, the sensor 10 is also provided with the pump current cut-off circuit 22 which forces the pump current to 0 in response to a pump current cut-off command. When the pump current is cut off, the voltage applied when the pump current corresponding to the theoretical air-fuel ratio is 0 is outputted, and this voltage is calibrated as the theoretical air-fuel ratio voltage.

The microcomputer 23 has the A/D converter 24 for converting to digital the output voltage from the current/voltage conversion circuit 21 of the air-fuel ratio detection circuit 20, performs filtering processing on the A/D converted values, and switches the filter gain by cutting off/connecting the pump current.

The filter processing can be performed by the microcomputer 23 using, for example, the following formula:

$$Vf(n)=(1-G)\times Vf(n-1)+G\times V(n) \quad (1)$$

Here, G represents a filter gain. V(n) represents an A/D value converted by the A/D converter 24 from the voltage outputted from the current/voltage conversion circuit 21 of the air-fuel ratio detection circuit 20. Vf(n−1) represents a previous filter processing computed value. Vf(n) represents a current filter processing computed value. Note that the filter gain G ($0\leqq G\leqq 1$) represents a computational ratio of the previous filter processing computed value Vf(n−1) and the detected voltage value (A/D value) which is V(n).

Further, when cutting off the pump current, the microcomputer 23 sends a command to the pump current cut-off circuit 22 to cut off the pump current, and calibrates the voltage from the current/voltage conversion circuit 21 of the air-fuel ratio detection circuit 20, as the theoretical air-fuel ratio voltage.

Figure 4:
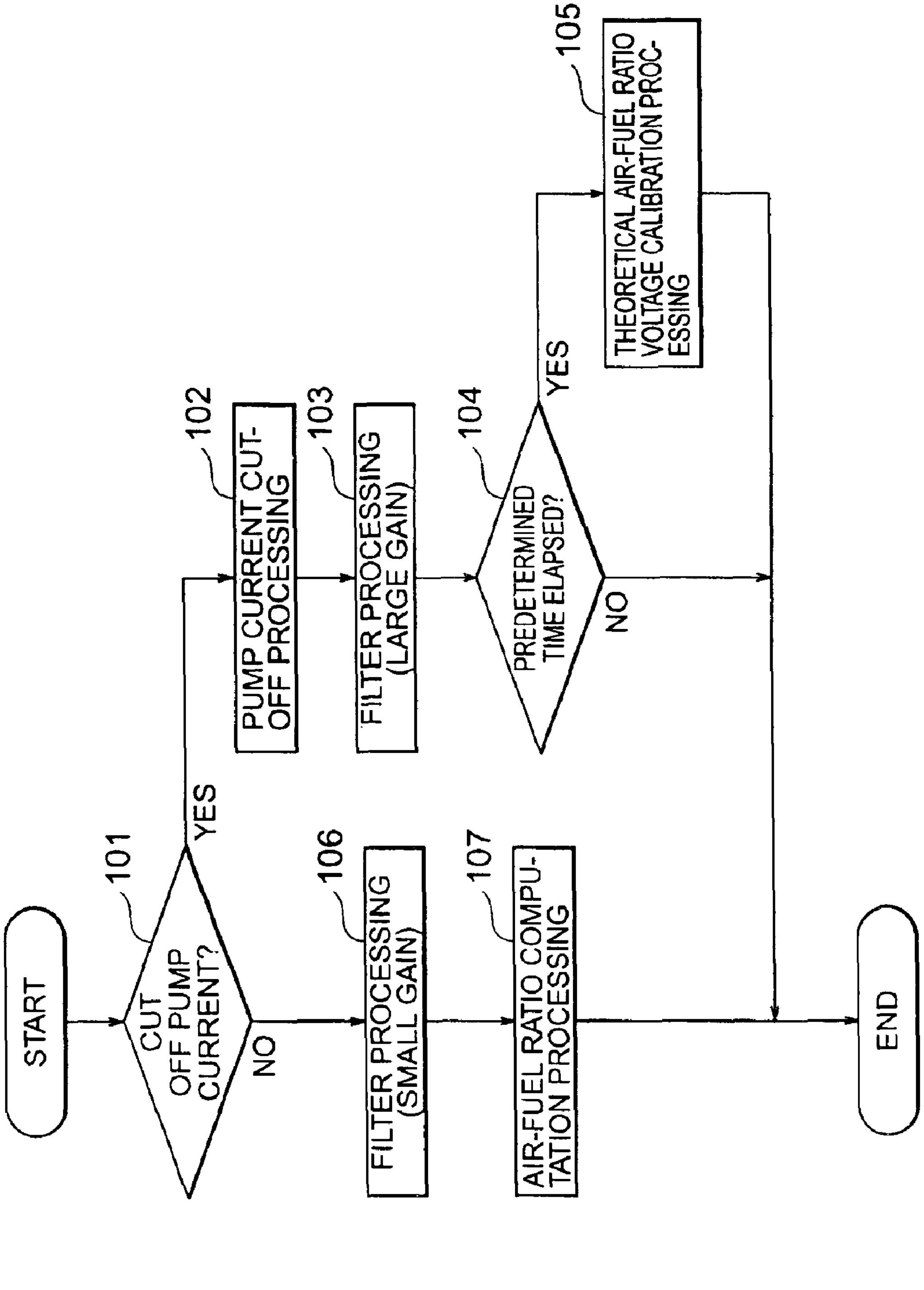
FIG. 4 is a flowchart showing operations of a microcomputer of the air-fuel ratio computing apparatus according to Embodiment 1 of the present invention.

FIG. 4 is a flowchart showing operations of the microcomputer of the air-fuel ratio computing apparatus according to Embodiment 1 of the present invention. Operations of the microcomputer 23 are explained with reference to FIG. 4.

First, at step 101, the microcomputer 23 determines whether or not to cut off the pump current to the linear air-fuel ratio sensor 10. If the pump current should be cut off, the process advances to the subsequent step 102. If not, the process advances to step 106. More specifically, in the case when the temperature of the linear air-fuel ratio sensor 10 (obtained from the air-fuel ratio detection circuit 20) is below a given value, the process advances to the next step 102 to cut off the pump current. If the temperature of the linear air-fuel ratio sensor 10 is equal to or greater than the given value, the process advances to step 106.

In a case where the engine is started while in the cold, the pump cell 11 heats up quickly when the electric current is provided to the pump cell 11 of the linear air-fuel ratio sensor 10. This may cause the pump cell 11 may break due to a thermal shock phenomenon (i.e., rapid change in temperature in solid matter), which is a so-called blackening phenomenon. Therefore, the pump current is cut off when the temperature of the linear air-fuel ratio sensor 10 is low. Note that, the pump current may be cut off when air-fuel ratio feedback is not being performed, such as when the fuel supply is cut off.

Next, at step 102, the microcomputer 23 outputs the pump current cut-off command to the pump current cut-off circuit 22, and the pump current cut-off circuit 22 cuts off the pump current to the linear air-fuel ratio sensor 10.

Next, at step 103, the filter gain G is set high to perform the filter processing on the A/D values of the voltages outputted from the current/voltage conversion circuit 21 of the air-fuel ratio detection circuit 20. That is, the above-mentioned formula (1) is used to obtain the filter processing computed value.

The deviation occurring in the theoretical air-fuel ratio voltage on the order of several LSBs (meaning 2–3 bits at the smallest digit) does not have an effect on the exhaust gas when running for a short amount of time. However, when running for a long period of time, the small error factor accumulates and can cause deterioration of the cleansing rate of the three-way catalyst 6. Therefore, when calibrating the theoretical air-fuel ratio voltage (where responsiveness is not important), the filter gain G is set high to suppress the deviation of the theoretical air-fuel ratio voltage caused by the theoretical air-fuel ratio in which the oscillations of the A/D values are suppressed.

Next, at step 104, it is determined whether or not a predetermined duration of time has elapsed. Since responsiveness is not important when calibrating the theoretical air-fuel ratio voltage, it takes time for the filter processing computed value of the voltage value immediately before cutting off the pump current to reach the theoretical air-fuel ratio voltage. Therefore, after cutting off the pump current, a duration of time is established for the filter processing computed value (the voltage value) to stabilize.

Next, at step 105, when it is judged that enough time has passed for the filter processing computed value to stabilize at the theoretical air-fuel ratio voltage value, the calibration is performed on the theoretical air-fuel ratio. That is, the filter processing computed value is transformed into the theoretical air-fuel ratio voltage. As shown in the characteristics of the linear air-fuel ratio sensor 10 shown in FIG. 3, the amount of the change of the air-fuel ratio per unit voltage is greater on the richer side of the theoretical air-fuel ratio than on the leaner side. In other words, even when the voltage deviation from the theoretical air-fuel ratio is the same, the amount of air-fuel ratio error is greater when calibrating toward the lean side, and thus the influence on the exhaust gas is greater. Therefore, when transforming the filter processing computed value (including decimal values) into the resolution of the theoretical air-fuel ratio voltage (i.e. natural integers not including decimal values), the value is calibrated toward the rich side, which has the smaller air-fuel ratio error. In other words, the values which do not satisfy the resolution of the theoretical air-fuel ratio (i.e. decimal values) are discarded, thereby decreasing the influence caused to the exhaust gas.

On the other hand, at step 106, when the predetermined amount of time passes after engine is started, and the temperature of the linear air-fuel ratio sensor 10 rises to or above the predetermined value, the filter gain G is set low and the filter processing is performed on the voltage values which are A/D converted by the A/D converter 24 from the voltage outputted from the current/voltage conversion circuit 21 of the air-fuel ratio detection circuit 20, thereby achieving the responsiveness of the air-fuel ratio computation. In other words, the above-mentioned formula (1) is used to obtain the filter processing computed value.

Next, at step 107, the air-fuel ratio is computed from the difference between the above-mentioned theoretical air-fuel ratio and the filter processing computed value obtained at step 106. Accordingly, it becomes possible to obtain an accurate air-fuel ratio in which various deviations have been suppressed. Based on this air-fuel ratio, the fuel injection amount from the fuel injection unit 3 can be adjusted, and the three-way catalyst 6 can be used efficiently to cleanse the exhaust gas.

What is claimed is:

1. An air-fuel ratio computing apparatus, comprising:

a linear air-fuel ratio sensor provided to an exhaust pipe of an engine, for measuring an air-fuel ratio of exhaust gas emitted from the engine; and an electronic control unit for repeatedly performing filter processing on the air-fuel ratio measured by the linear air-fuel ratio sensor, using a formula $$Vf(n)=(1-G)\times Vf(n-1)+G\times V(n),$$

where V(n) represents a voltage value corresponding to the air-fuel ratio measured by the linear air-fuel ratio sensor, Vf(n−1) represents a previous computed value from the filter processing, $G(0\leqq G\leqq 1)$ represents a filter gain expressing a computational ratio of V(n) and Vf(n−1), and Vf(n) represents a current computed value of the filter processing, wherein, in a case where a temperature of the linear air-fuel ratio sensor is below a predetermined temperature, the electronic control unit cuts off a pump current to the linear air-fuel ratio sensor, performs the filter processing with the filter gain G set to a first predetermined value, and transforms a computed value from the filter processing into a theoretical air-fuel ratio voltage; and in a case where the temperature of the linear air-fuel ratio sensor rises to or above the predetermined temperature, the electronic control unit performs the filter processing with the filter gain G set to a second predetermined value that is smaller than the first predetermined value, and computes an air-fuel ratio from the difference between a computed value from the filter processing and the theoretical air-fuel ratio voltage.

2. An air-fuel ratio computing apparatus according to claim 1, wherein the electronic control unit 1 comprises:

an air-fuel ratio detection circuit for detecting the temperature of the linear air-fuel ratio sensor, and detecting an air-fuel ratio electric signal from the linear air-fuel ratio sensor;

a current/voltage conversion circuit for transforming the air-fuel ratio electric signal detected by the air-fuel ratio detection circuit into a voltage value;

a microcomputer that, in a case where the temperature of the linear air-fuel ratio sensor detected by the air-fuel ratio detection circuit is below the predetermined value, outputs a pump current cut-off command to cut off the pump current to the linear air-fuel ratio sensor, performs the filter processing with the filter gain G set to the first predetermined value, and transforms the computed value from the filter processing into the theoretical air-fuel ratio voltage; and in a case where the temperature of the linear air-fuel ratio sensor detected by the air-fuel ratio detection circuit rises to or above the predetermined value, performs the filter processing with the filter gain G set to the second predetermined value that is smaller than the first predetermined value, and computes the air-fuel ratio from the difference between the computed value from the filter processing and the theoretical air-fuel ratio voltage; and a pump current cut-off circuit for cutting off the pump current to the linear air-fuel ratio sensor in response to the pump current cut-off command.

3. An air-fuel ratio computing apparatus according to claim 2, wherein when the microcomputer transforms the computed value from filter processing when the filter gain G was set to the first predetermined value into the theoretical air-fuel ratio voltage, the microcomputer calibrates toward the side with the smaller air-fuel ratio error.

* * * * *